United States Patent [19]

Sone et al.

[11] Patent Number: 5,104,365
[45] Date of Patent: Apr. 14, 1992

[54] PAPER SHEET BENDING APPARATUS IN BAG MAKING MACHINE

[76] Inventors: Tomio Sone; Masanori Sone, both of 1-22, Nakakura 2 chome, Wakabayashi-ku, Sendai-shi, Miyagi-ken, Japan

[21] Appl. No.: 589,361

[22] Filed: Sep. 28, 1990

[51] Int. Cl.$^5$ .................. B31B 1/36; B31B 33/36
[52] U.S. Cl. ........................... 493/1; 493/23; 493/248; 493/479
[58] Field of Search ............ 493/1, 2, 23, 248, 439, 493/440, 451, 476, 479

[56] References Cited

U.S. PATENT DOCUMENTS

| | | | |
|---|---|---|---|
| 3,566,756 | 3/1971 | Schmid et al. | 493/476 |
| 3,683,756 | 8/1972 | Wilson | 493/479 |
| 4,994,008 | 2/1991 | Haake et al. | 493/2 |

FOREIGN PATENT DOCUMENTS 133823 3/1985 European Pat. Off. .......... 493/1

Primary Examiner—William E. Terrell
Attorney, Agent, or Firm—Edwin E. Greigg; Ronald E. Greigg

[57] ABSTRACT

Computer controlled method and apparatus for paper sheet bending in a bag making machine for making hand bags, pocketbooks, vanity cases, etc. Two computers are used to store the information needed to allow the machine to make bags of various types and sizes from paper of various qualities and thicknesses. Data concerning the bag itself is stored in the memory of a first computer while data concerning the properties of the paper to be used is stored in the second computer. Both types of data are needed to precisely and automatically position the guide plates for properly locating the desired bends in the paper. The bag type and paper type can be changed quickly with little loss in production time.

6 Claims, 5 Drawing Sheets

PAPER SHEET BENDING APPARATUS IN BAG MAKING MACHINE

BACKGROUND OF THE INVENTION

This invention relates to a paper sheet bending apparatus in a bag making machine. Particularly, this invention is suitable for manufacturing hand bags, portable bags, pocketbook, or vanity cases with a square bottom.

Heretofore, in the case of manufacturing hand bags with a square bottom using a paper sheet of a predetermined size which includes no score line, a paper sheet bending apparatus comprised a pair of left and right frames, a plurality of guide rollers laterally and axially supported by these frames with a predetermined spacing therebetween, a plurality of manually rotatable guide shafts arranged above or below these guide rollers, and a plurality of guide plates for bending a paper sheet provided through screw bodies on these guide shafts, respectively.

However, the apparatus described above has the following drawbacks:

(1) In the case of determining widths of the respective guide plates, respective guide shafts had to be manually rotated. Accordingly, it took much time in adjustment of respective guide plates. Further, since adjustments of respective guide plates were made on the basis of experience, skillfulness was required.

(2) Rotational adjustments of respective guide shafts are carried out every time an expert manufactures respective bags. However, those adjustment contents could not be retained as data.

(3) Fine adjustments of respective guide plates are not easy, and much time is required for such adjustments. As a result, the bag manufacturing efficiency could not be improved.

SUMMARY OF THE INVENTION

A first object is to automatically determine, in a short time, widths of a plurality of guide plates for forming a hand bag or a portable bag.

A second object is to permit even persons other than an expert to easily carry out fine adjustments in width determination of guide plates.

A third object is to retain, as data, the adjustment contents made by an operator to utilize later that data at the time of manufacturing various kinds of bags, thus to form higher precision bags.

The final object is to provide a scheme such that any error of width adjustments of respective guide plates which may be produced every time various kinds of bags are manufactured is not stored into the memory means of the computer.

To achieve the above-mentioned objects, a paper sheet bending apparatus in a bag making machine according to this invention comprises a main computer including first memory means for storing sizes of various kinds of bags to be manufactured, a correction value command computer connected to the main computer and including second memory means for storing a plurality of conditions of a paper sheet such as quality, thickness, surface processing, etc., a plurality of control units connected to the main computer through a signal transfer unit, a plurality of drive motors connected to these control units through motor drivers, respectively, a plurality of guide shafts respectively joined to drive shafts of these drive motors and laterally and axially supported by left and right frames, a plurality of guide plates for bending a paper sheet provided through screw bodies on these guide shafts, respectively, and a plurality of encoders respectively provided on the plurality of drive motors and adapted to individually sense quantities of rotations of the respective guide shafts to deliver sense signals to respective control units.

DESCRIPTION OF THE PREFERRED EMBODIMENTS

This invention will be described in detail in connection with embodiments shown.

Figure 1:
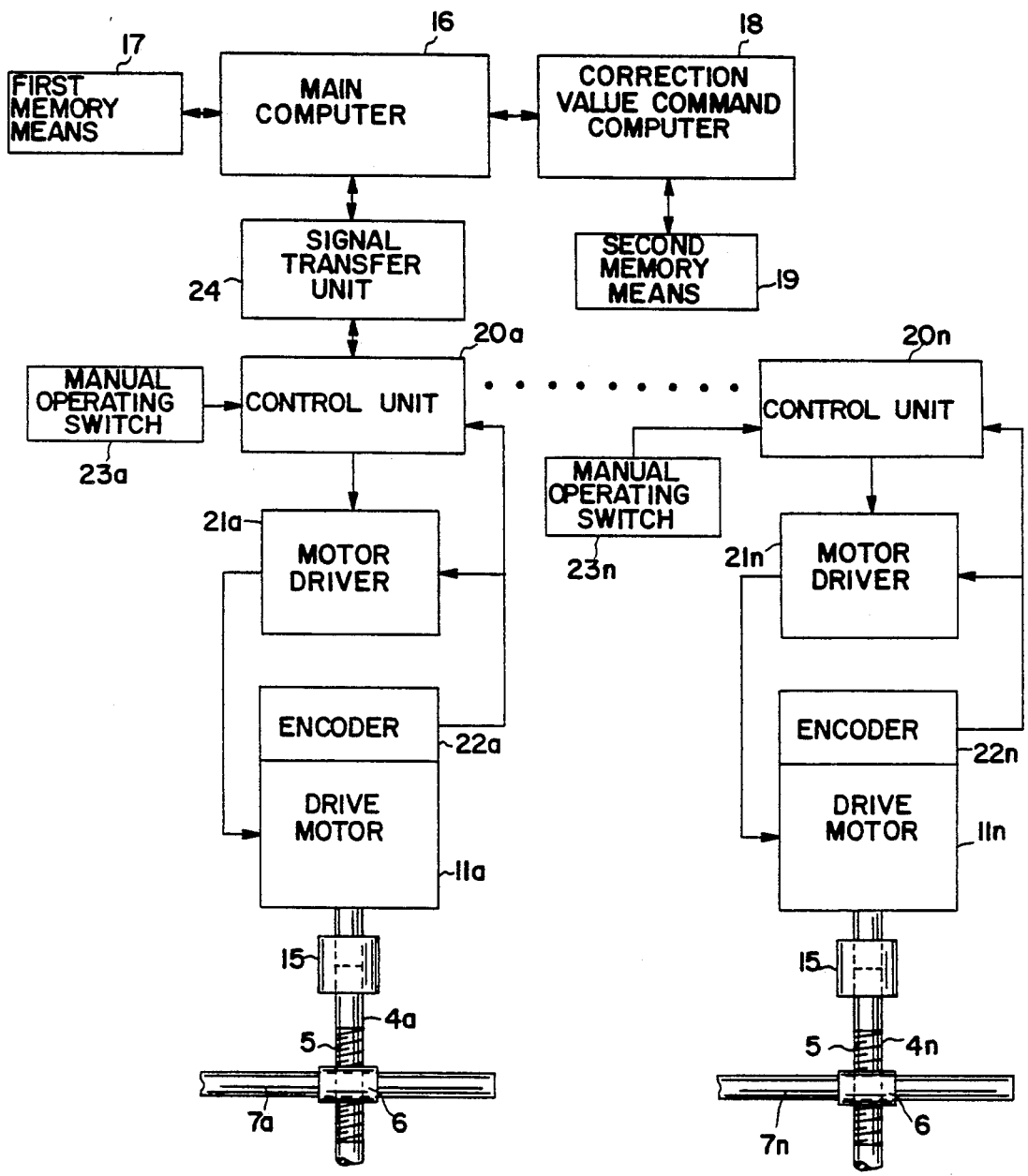
FIG. 1 is an explanatory view showing an embodiment of this invention.
Figure 2:
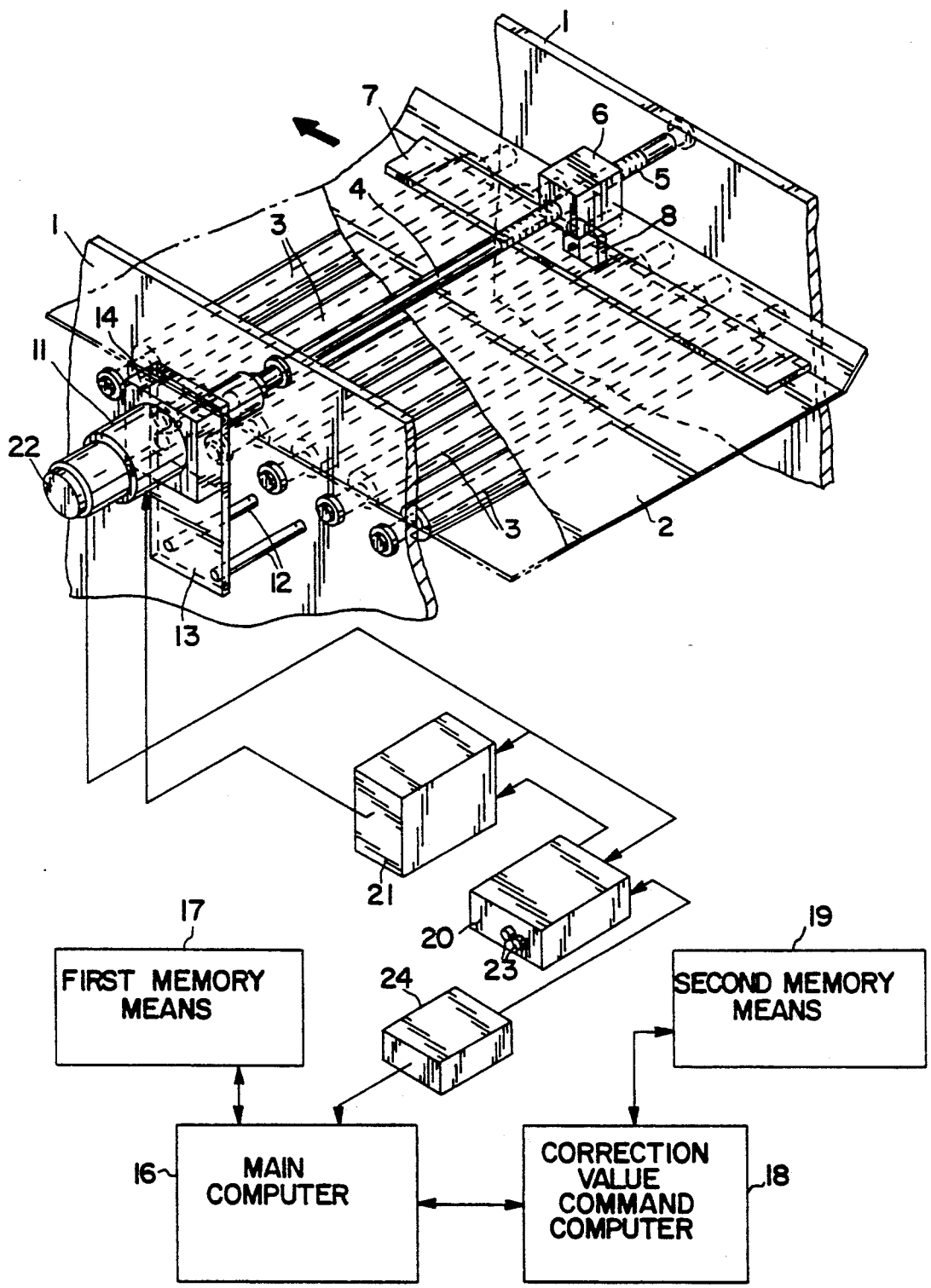
FIG. 2 is a schematic explanatory view showing the relationship between the guide plate and the computer of this invention.
Figure 3:
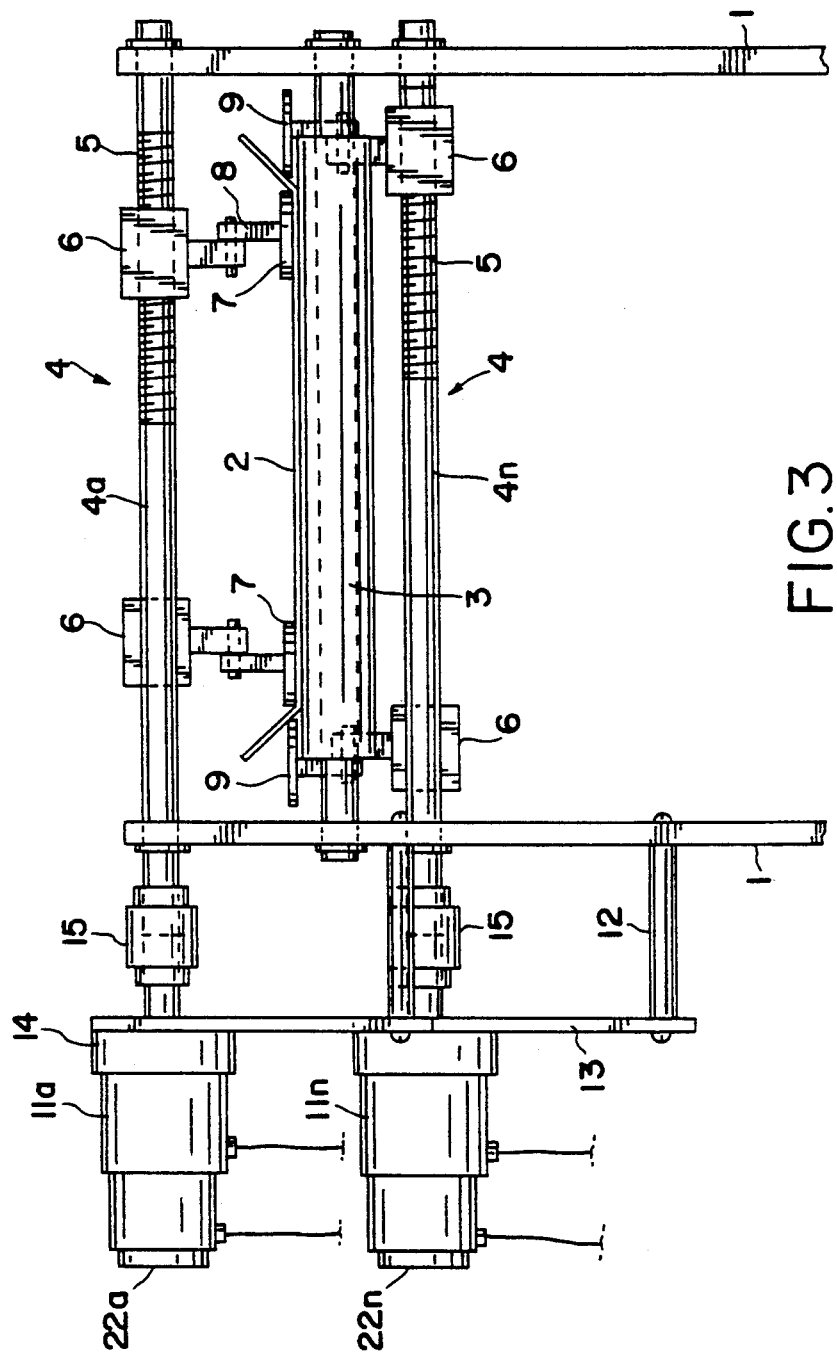
FIG. 3 is a schematic explanatory view showing the essential part of this invention.

In an embodiment shown in FIGS. 1 to 3, reference numeral 1 denotes left and right frames constituting a portion of a bag making machine. These frames 1 are faced to each other with a required spacing therebetween so as to permit a paper sheet 2 to flow in one direction.

Reference numeral 3 denotes a plurality of guide rollers laterally and axially supported by the frames 1. These guide rollers 3 are arranged in a horizontal state with a predetermined spacing therebetween. The paper sheet 2 is guided by these guide rollers 3 and a plurality of small guide rollers positioned above (not shown) and is moved in a direction indicated by an arrow.

Reference numeral 4 denotes guide shafts each having a male screw 5 at the position close to the one end portion thereof. These guide shafts 4 are laterally and axially supported by the left and right frames above the guide rollers 3. A plurality of guide shafts 4 are provided in correspondence with the number of guide plates which will be described later. In FIG. 2, only one upper guide shaft 4 is shown for convenience of explanation. A plurality of guide shafts 4a to 4n are laterally and axially provided above and below the guide rollers 3 as shown in FIG. 3.

Reference numeral 6 denotes upper screw bodies screw-threadedly connected to the respective guide shafts 4 and moving in left and right directions.

Reference numeral 7 denotes first guide plates for bending a paper sheet provided in a horizontal state through supporting rods 8 below the screw bodies 6, respectively. Each first guide plate 7 and the upper screw body 6 are combined in one body. A pair of first guide plates 7 are provided on the left and right sides with the state of FIG. 3 being as a reference, respectively. It is to be noted only one screw body is provided on each guide plate. These first guide plates 7 are in the form of an elongated plate, and are provided perpendicular to the respective guide shafts 4. Further, first guide plates 7 are fixedly suspended by the screw bodies 6 with slight gaps between these first guide plates and the guide rollers 3, respectively.

Reference numeral 9 denotes second guide plates for bending a paper sheet provided between the first guide plates 7 and the frames 1, respectively. Each second guide plate 9 and the lower screw body 6 for moving on the lower guide shaft 4 are combined in one body. A pair of second guide plates 9 are provided on the left and right sides so as to face the left and right first guide plates 7 as shown in FIG. 3, respectively.

Reference numeral 11 denotes a plurality of drive motors provided outside the frames 1 through supporting rods 12, a mounting plate 13, and mounting boxes 14, respectively. The drive shafts of the drive motors 11 are connected to one end portions of the upper and lower guide shafts 4 through joints 15, respectively.

Reference numeral 16 denotes a main computer including first memory means 17 for storing sizes of various kinds of bags to be manufactured. This main computer 16 outputs a signal to the control units so as to respectively permit the above-described guide shafts 4 to be rotated in accordance with a value calculated on the basis of a specific calculation formula in correspondence with an input size of a bag to be manufactured with no consideration of various conditions of a paper sheet which will be described later. In this embodiment, data inputted to the main computer 16 are the length and breadth (width) of a bag to be manufactured. The main computer 16 computes sizes of length and breadth of the bag in a manner of the greatest common divisor to evaluate specific values, respectively.

Accordingly, where only this main computer 16 is utilized, adjustments of the first guide plates 7 become coarse.

Reference numeral 18 denotes a correction value command computer connected to the main computer 16 and including second memory means 19 for storing a plurality of conditions of a paper sheet. In this example, the plurality of conditions mean four input items of quality of the paper sheet, thickness of the paper, score line of the paper, and presence or absence of the surface processing. This correction value command computer 18 evaluates a specific correction value from the combination of a plurality of conditions to deliver a correction signal indicative of the correction value thus evaluated to the main computer 16.

Accordingly, where this correction value command computer 18 is used, adjustments of the first guide plates 7 result in fine adjustments.

Reference numeral 20 denotes a plurality of control units connected between the main computer 16 and the above-described drive motors 11, respectively. These control units 20 deliver signals transmitted from the main computer 16 to the drive motor 11 sides through motor drivers 21. Further, these control units 20 are connected to encoders affixed on the drive motors 11 to confirm width determination sizes of the first guide plates on the basis of signals sensed by the encoders 22 to deliver those signals to the main computer 16. Each motor driver 21 makes a comparison between an information signal from the control unit 20 and a sense signal from the encoder 22 to drive the drive motor 11 so that the size of width becomes equal to a width determination size transmitted from the main computer 16 side. Further, each encoder 22 senses a quantity of movement of the first guide plate 7 to deliver that sense signal to the motor driver 21 and the control unit 20.

Reference numeral 23 denotes a manual operating switches directly provided on the control units 20, respectively. Each manual operating switch 23 is used in the case where data relating to some kinds of paper sheets 2 are not sufficiently stored in the correction value command computer 18, and therefore normal bags cannot be formed even by making use of correction values evaluated by the correction value command computer 18 at the time of manufacturing those bags. Additionally, reference numeral 24 denotes a single signal transfer unit provided between the main computer 16 and a plurality of control units 20a to 20n.

In the above-mentioned configuration, in the case of attempting to manufacture a hand bag with a square bottom, sizes of length and breadth of the hand bag are inputted to the main computer 16 respectively.

Thus, the main computer 16 picks up a specific value from the first memory means 17 to send a signal to the motor driver 21 through the control unit 20. The motor driver 21 drives the drive motor 11 on the basis of this signal. When the drive motor 11 is driven, the guide shaft 4 is rotated. As a result, the first guide plate 7 moves so that a size of width becomes equal to a width determination size transmitted from the main computer 16.

When one adjustment of the first guide plate 7 is completed, a signal is transmitted from the signal transfer unit 24 to the next control unit 20b. As a result, the guide shaft 4b is rotated. Thus, another adjustment of the first guide plate 7 is carried out. When the determination of width of the first guide plate 7 is completed, signals are transmitted in sequence from the signal transfer unit 24 to the succeeding control units up to 20n, whereby determinations of widths of guide plates 7a to 7n are carried out, respectively.

Thereafter, an operator allows one paper sheet 2 to flow into the bag making machine. If an acceptable bag is made up, this operation is considered to be "OK".

However, there are many instances where an acceptable hand bag cannot be ordinarily made up by simply inputting the sizes of that bag into the main computer 16. As stated above, when an acceptable bag cannot be made up, a plurality of conditions of the paper sheet 2 are inputted to the correction value command computer 18. Thus, the correction value command computer 18 picks up a specific correction value from the second memory means 19 to output a signal indicative of an instruction of correction to the main computer 16. Upon receiving this instruction of correction, the main computer 16 sends a signal indicative of a correction value to the control unit 20 for a second time. As a result, the first guide plate 7 is finely adjusted. At this time, the operator allows a second paper sheet to flow into the bag making machine. If an acceptable bag can be made up, this operation is considered to be "OK".

However, if an acceptable bag fails to be made up even by such an operation, the manual operating switch 23 is operated.

Thus, when the manual operating switch 23 is operated, a signal is transmitted from the control unit 20 to the motor driver 21, so the drive motor 11 is driven. As a result, the first guide plate 7 is slightly moved in a left or right direction. At this time, the encoder 22 senses a quantity of rotation of the guide shaft 4 to transmit this sense signal to the main computer 16 side through the control unit 20. As a matter of course, when the manual operating switch 23 is utilized in regard to the paper sheet, that operation is stored into a correction value command computer 18 as new data.

In the manner stated above, the paper sheet is desirably bent. Thus, a normal hand bag is completed.

Figure 4:
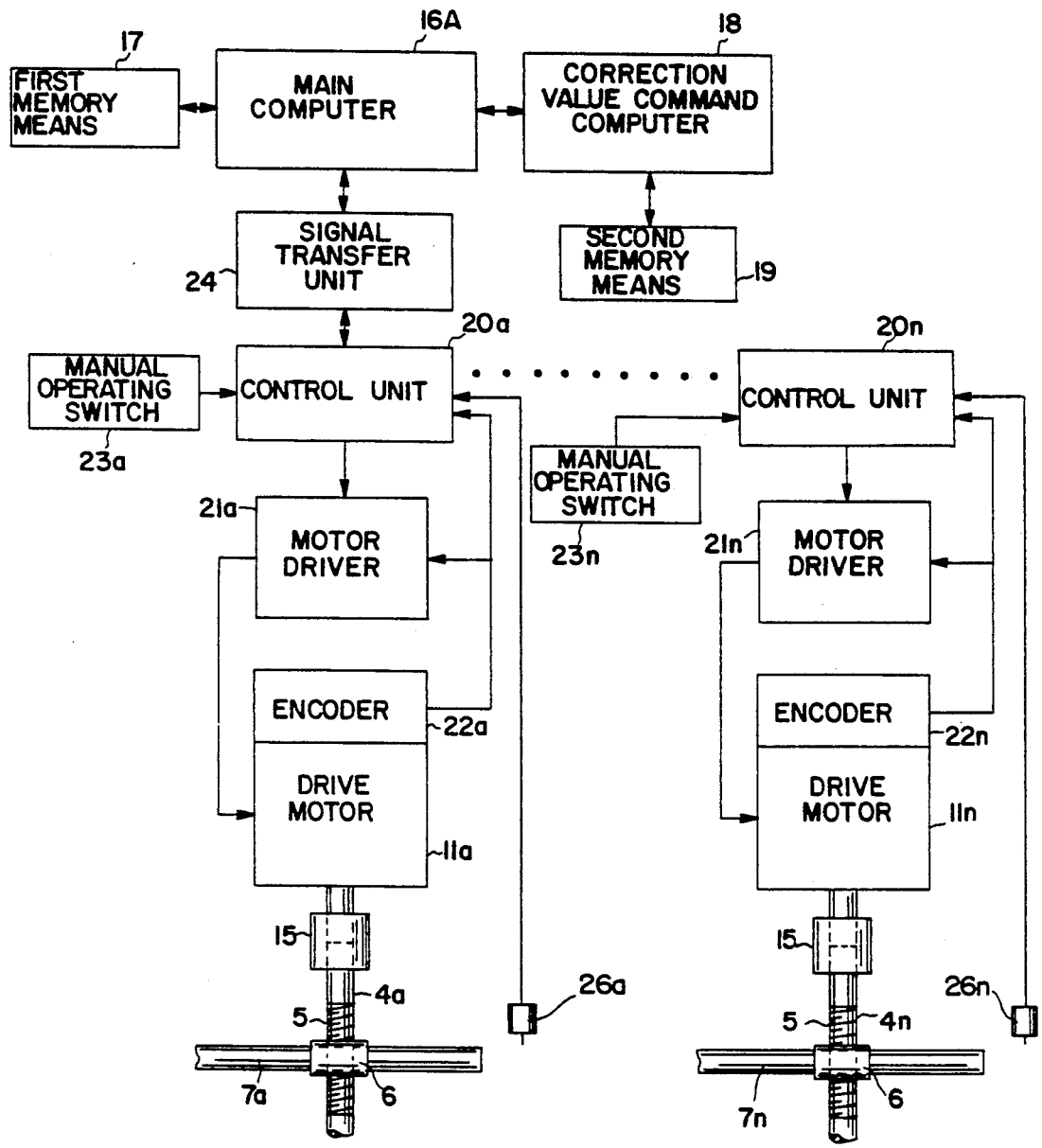
FIGS. 4 and 5 are explanatory views showing a different embodiment of this invention.
Figure 5:
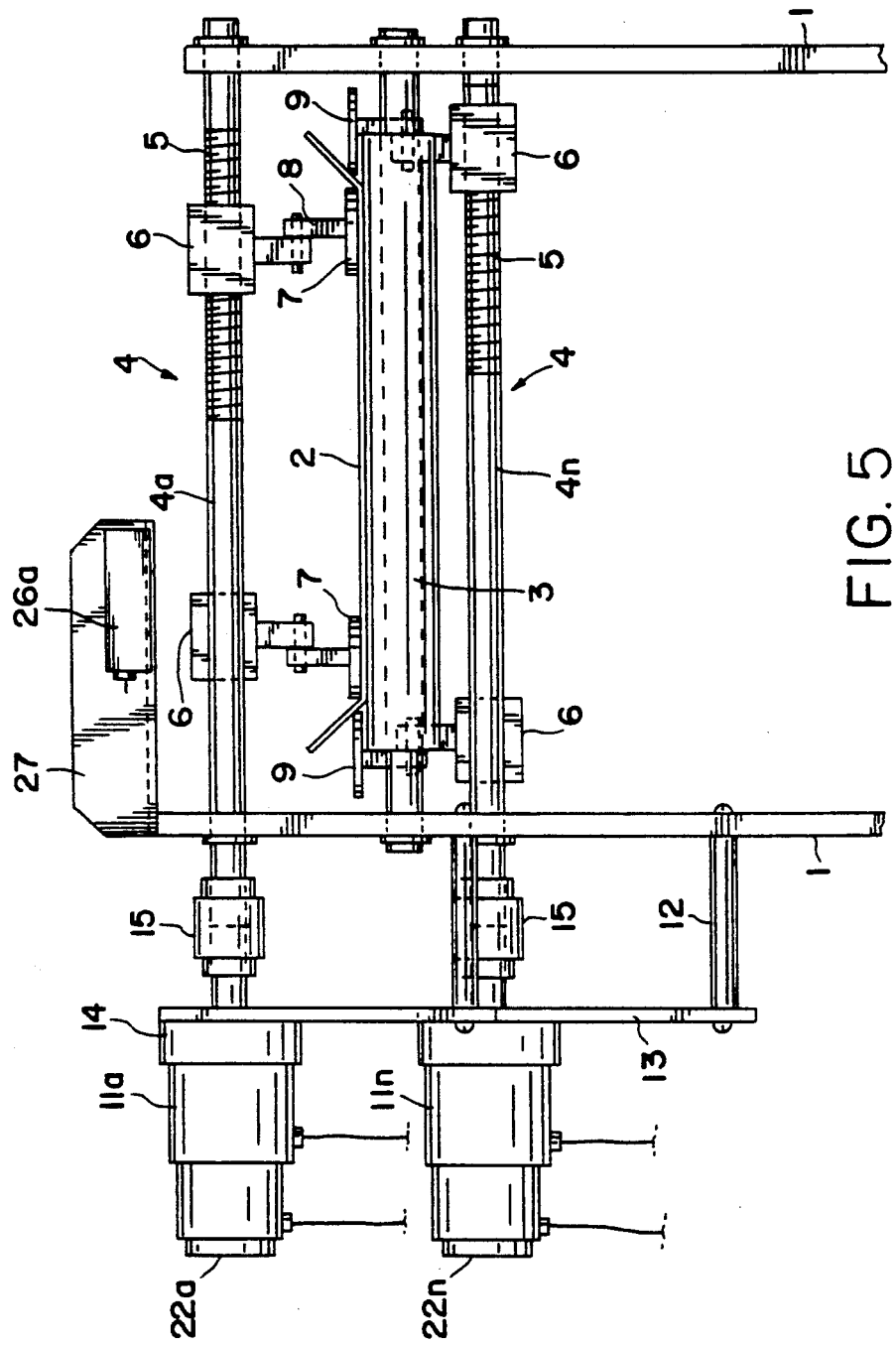

A different embodiment of this invention as shown in FIGS. 4 and 5 will now be described.

It is to be noted that the same or similar reference numerals are attached to the same portions as those of the embodiment of FIGS. 1-3 in making an explanation of the embodiment of FIGS. 4 and 5, and repetitive explanations will be omitted.

In the embodiment shown in FIGS. 4 and 5, a new component is added to the embodiment of this invention shown in FIGS. 1-3.

Namely, a plurality of origin sensors 26a . . . 26n for sensing origins of the guide plates 7a . . . 7n are connected to the control units 20a . . . 20n, respectively. Each origin sensor is fixedly provided on the frame 1 through a supporting plate 27 as shown in FIG. 5.

In this configuration, in the case of making determinations of width of respective guide plates, a procedure is taken to move outwardly respective guide plates to once return them to the position of the origin (0) thereafter to carry out such width determinations.

As is clear from the foregoing description, this invention provides the advantages as recited below.

(1) Since it is possible to automatically adjust guide plates for bending a paper sheet, any improvement in the efficiency of adjustment work can be made in manufacturing hand bags with other different square bottoms.

(2) Since the correction value command computer is connected to the main computer, fine adjustments of guide plates are carried out with ease.

(3) Even if an operator is not an expert, he can carry out width determinations of respective guide plates simply and in a short time.

(4) In the case of the embodiment where the manual operating switch is provided in the control unit, a desired bag can be manufactured even when various conditions relating to a paper sheet of a bag to be manufactured are not inputted into the correction value command computer.

(5) Every time the manual operating switch is utilized, new data can be stored in sequence into the correction value command computer through the encoder and the control unit, etc. Accordingly, according as the number of times of fine adjustments of the guide plate increases, the accuracy of data of the correction value command computer increases.

(6) In the case of the embodiment where origin sensors are connected to respective control units, errors in the adjustment of the guide plate moving through the screw body are not stored into the correction value command computer. Accordingly, high accuracy adjustment can be made at all times.

What is claimed is:

1. A paper sheet bending apparatus in a bag making machine wherein the paper sheet becomes part of the bag being made, said apparatus comprising:

a main computer including first memory means for storing data concerning sizes of various kinds of bags to be manufactured;

a correction value command computer including second memory means for storing data concerning a plurality of conditions of said paper sheets including thickness and quality, this data is used to serve as a correction factor by said main computer;

means directly connecting said correction value command computer to said main computer to convey data concerning said paper sheet conditions from said second memory means to said main computer, said main computer using both said paper condition data from said second memory and said bag data from said first memory means to produce positioning signals;

a plurality of control units connected to said main computer through a signal transfer unit;

a plurality of drive motors connected to said control units through motor drivers, respectively;

a plurality of guide shafts respectively joined to drive shafts of said drive motors and laterally and axially supported by left and right frames;

a plurality of guide plates for bending said paper sheet, said guide plates connect to screw bodies on said guide shafts, respectively;

a plurality of encoders respectively provided on said plurality of drive motors and adapted to individually sense quantities of rotations of said respective guide shafts to deliver sense signals to said respective control units; and origin sensors for sensing origins of guide plates are connected to said control units, respectively, each of said origin sensors being fixedly provided on said frame through a supporting plate.

2. A paper sheet bending apparatus in a bag making machine as set forth in claim 1, wherein said control units are provided with manual operating switches, respectively.

3. For use in a bag making machine for making bags of various types and sizes using at least one paper sheet to form at least part of said bag, a paper sheet bending apparatus comprising:

a main computer including first memory means for storing data concerning said various types and sizes of bags;

a correction value command computer including second memory means for storing data concerning possible conditions of said paper sheet, said conditions including thickness and quality of said sheet, said correction computer arranged to send this paper condition data to said main computer to be used by said main computer as a correction factor;

means connecting said correction value command computer to said main computer so that said paper condition data sent by said correction computer is received by said main computer, said main computer using said paper condition data as well as said bag type and size data from said first memory means to produce positioning signals;

a signal transfer unit for receiving said positioning signals from said main computer and forwarding them to a plurality of control units;

a plurality of drive motors connected to said control units through a plurality of motor drivers, respectively, each of said drive motors having a drive shaft;

a plurality of partially threaded guide shafts joined respectively to said drive shafts, said guide shafts being supported axially by left and right frames on said sheet bending apparatus;

a plurality of guide plates for bending said paper sheet, said plates being moved by means of screw bodies mounted on said threaded guide shafts to move along said guided shafts when said guide shaft rotates;

a plurality of encoders respectively provided on said plurality of drive motors, said encoders being adapted to individually sense the amount of rotation of said respective guide shafts; and means to feed back rotation signals from said drive motors to respective control units.

4. A paper sheet bending apparatus as set forth in claim 3, wherein there are a plurality of origin sensors for sensing the original positions of said guide plates and wherein said guide plates are returned to their positions of origin and thereafter moved to the desired paper bending positions.

5. A paper sheet bending apparatus as set forth in claim 3, wherein said control units are provided with manual operating switches for manually adjusting when data relating to a particular paper is not adequately stored in the second memory means.

6. A paper sheet bending apparatus as set forth in claim 4, wherein said origin sensors are each fixedly provided on said frame through a supporting plate.

* * * * *